Figure 6:
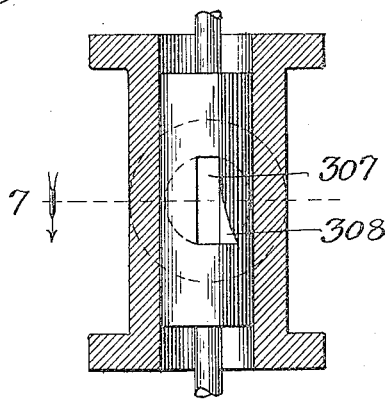

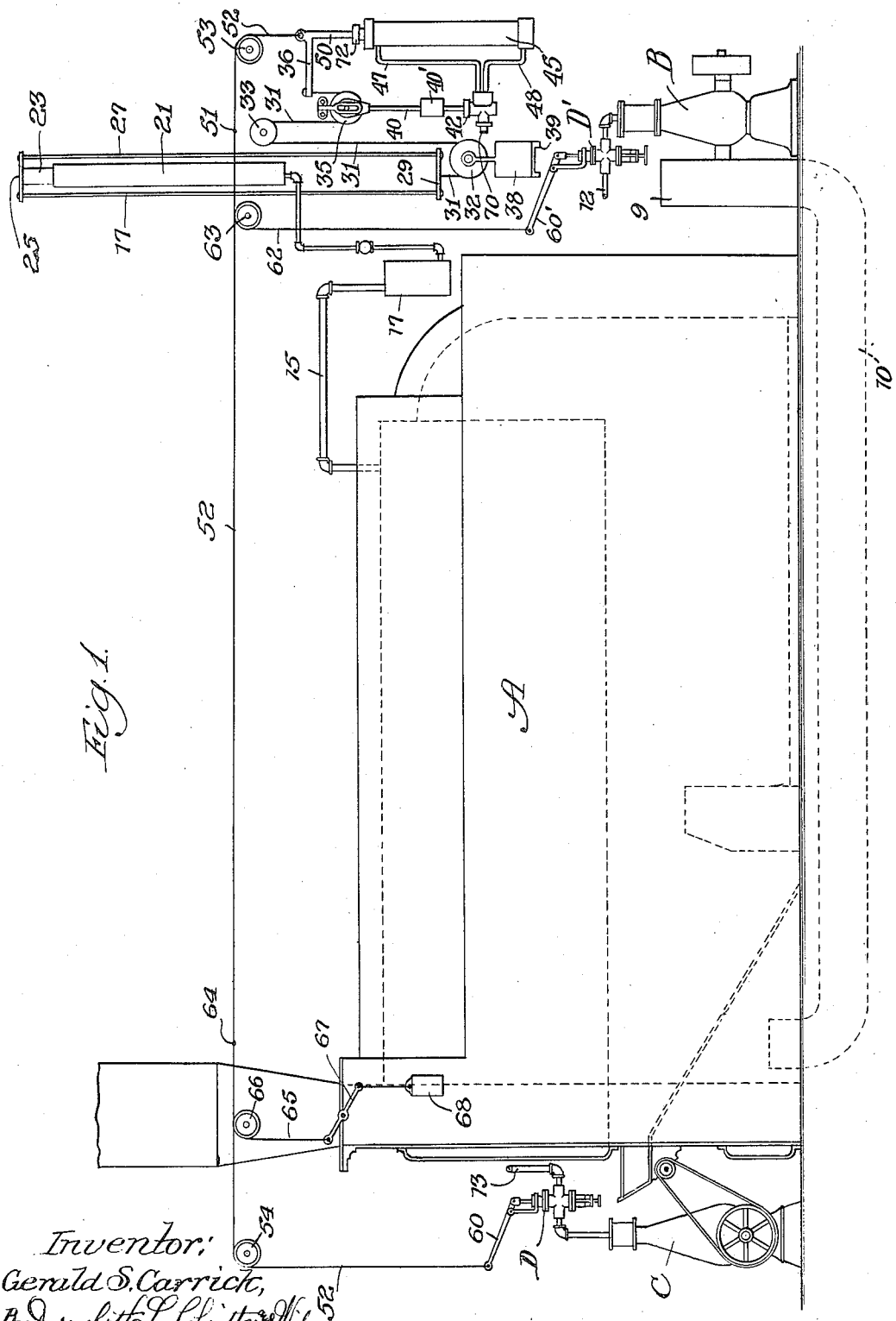

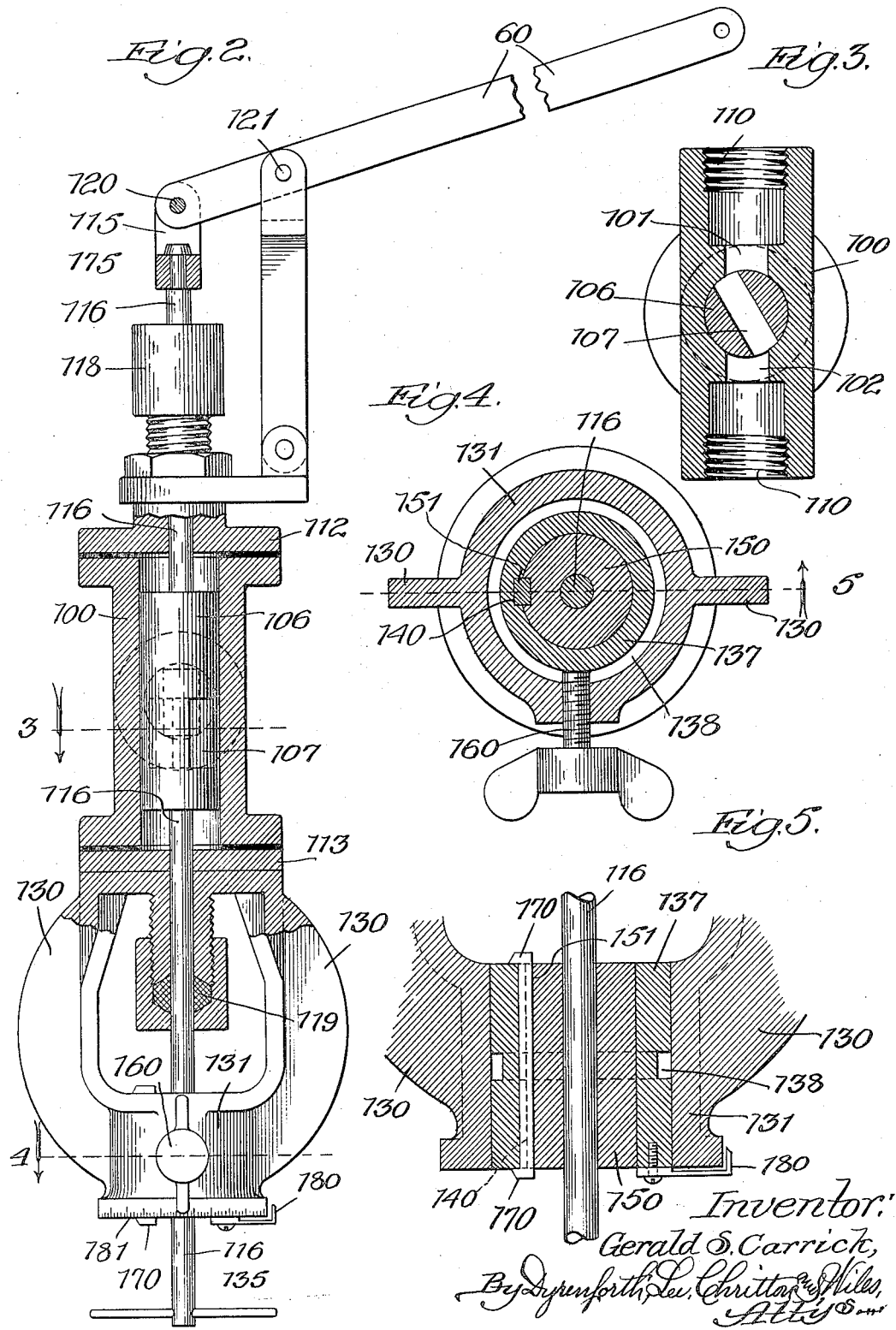

July 22, 1924.

G. S. CARRICK

AUTOMATIC CONTROL DEVICE 1,502,548

Filed Jan. 26, 1921  3 Sheets—Sheet 3

Inventor:
Gerald S. Carrick,
By Dyrenforth, Lee, Chritton and Wiles,
Attys.

Patented July 22, 1924.

1,502,548

UNITED STATES PATENT OFFICE.

GERALD S. CARRICK, OF CHICAGO, ILLINOIS.

AUTOMATIC CONTROL DEVICE.

Application filed January 26, 1921. Serial No. 439,992.

*To all whom it may concern:*

Be it known that I, GERALD S. CARRICK, a citizen of the United States, residing at Chicago, in the county of Cook and State of Illinois, have invented a new and useful Improvement in Automatic Control Devices, of which the following is a specification.

This invention relates to improvements in automatic control devices and more especially to that kind of automatic control device where the rate of flow of steam, water or other fluid is controlled by a mechanism automatically fluctuating with respect to a variable such as pressure. My invention is especially adapted for use in those automatic control devices where it is necessary or desirable to vary the range through which the rate of flow of the fluid is controlled with respect to the range of fluctuation of the variable. In other words, it is especially adapted for use, for example, in a device adapted to control the rate of flow of steam through a valve by fluctuations of steam pressure in a boiler; but where the maximum rate of the steam flow controlled must be varied with respect to a constant range of fluctuation of steam pressure. Thus, for example, in a device by which the fluctuations of steam pressure in a boiler control the blower engine supplying air to the fire and the stoker engine feeding the fuel, such control of the blower and stoker engines is usually effected by controlling the steam supply thereto. Now, in such devices it frequently is found that one of the controls must be varied with respect to the other. For example, varying resistances of different kinds of fuels to the stoker engine, or other factors, may require variations in the control of one of the engines in order to maintain the correct relation between the air supply and fuel feed. In order to vary the control it is necessary to vary the maximum opening of the valve. Also, in some cases, it is found that the steam supply for the blower and stoker engines comes from an independent source that does not supply a constant pressure; and consequently in order to vary the speed of one of the engines from its maximum to its minimum, the maximum opening of the valve controlling the supply of steam thereto will depend upon the pressure at which steam is supplied. It is therefore necessary or desirable, in such cases to be able to vary such maximum opening without varying the stroke of the valve. Besides the pressure at which steam is supplied to the blower or stoker engine, there are other factors which might require a change of or adjustment in the maximum opening of the valve controlling the steam supply. For example, the condition of the engine itself, its ease of operation, and the like, may require alterations in the maximum opening of the valve controlling the steam supply in order to permit variations in the speed of such engine to cover the full range from its maximum speed to its minimum. Also, in some cases, as, for example, where different kinds of fuel are used, or where obstructions or leaks in the conduit leading from the blower engine to the fires, necessitate changes in the maximum or minimum speed of the stoker or blower engine, it is necessary or desirable to change the maximum opening of the valve controlling the supply of steam to such engine, without changing the stroke of the valve.

My invention further comprises a novel valve adapted for use as a part of an automatic control device of the character described, and so constructed that it may be controlled by a mechanism moving through a constant stroke but readily and quickly adjusted or set so that its range of operation or maximum opening may be varied with respect to said stroke.

For the purpose of illustrating my invention, I have shown in the accompanying drawings one embodiment thereof, although it is to be understood that the various instrumentalities of which my invention consists can be variously arranged and organized, other and different parts may be substituted for those shown and parts may be omitted or changed, all without detracting from the spirit of my invention. For example, although in the drawings I have shown an automatic control device in which fluctuations of steam pressure in a boiler control the speed of a blower and a stroker engine, and in which valves embodying features of my invention are used to control the supply of steam to the blower and stoker engines; it is obvious that, without detracting from the spirit of my invention, either of such blower or stoker engines or both may be controlled by fluctuations in pressure of gases in the fire box of the furnace instead of the pressure of steam in the boiler. Likewise, in an automatic control device in which feed water supply is controlled by variations in water level or flow of steam from a boiler, my improved valve may be used either to control the supply of steam to the feed water pump or to control the flow of water itself from the feed pump to the boiler. In such devices the range of operation of the valve or its maximum opening may be easily changed, adjusted and set although the stroke of its operating mechanism remains constant. Such changes may be necessitated by variations in the pressure of steam supplied to the feed pump, or variations in the pressure of the feed water itself, and the like. For example, where the feed water supply is automatically controlled by variations in water level, and where a valve embodying features of my invention is used to control the supply of steam (from an independent source) to the feed water pump, the maximum opening of the valve may be changed, without changing its stroke. The increasing of such maximum opening may be necessitated, for example, by a lowering of the pressure of the steam supplied to the feed pump. In a similar manner, a valve embodying features of my invention and similar to the ones shown in the accompanying drawings may be used to control the supply of gas to a gas producer, the supply of oil to an oil burner, the air draft blowing powdered coal, the flow of steam used in connection with an oil burner, and the like, or the flow of any fluid, where it is necessary or desirable to vary the range of opening of the valve without varying its stroke.

Figure 7:
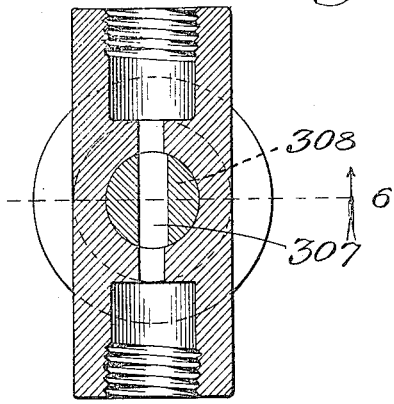
Figure 8:
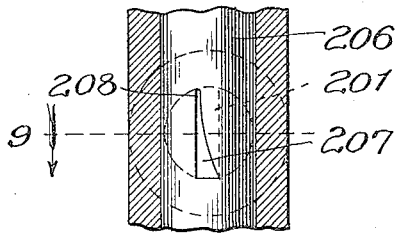
Figure 9:
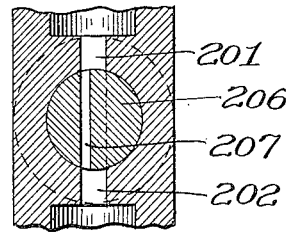
Figure 10:
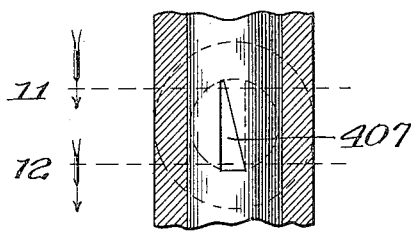
Figure 11:
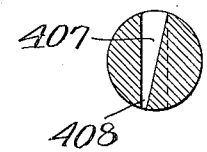
Figure 12:
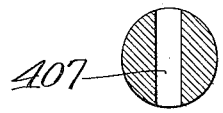

In that form of device embodying the features of my invention shown in the accompanying drawings, Figure 1 is a diagrammatic view showing a boiler in combination with an automatic control device suitable for the practice of my invention, Figure 2 is a vertical sectional view of one of the valves forming a part of the automatic control device, Figure 3 is a view taken as indicated by the line 3 of Fig. 2, Figure 4 is a view taken as indicated by the line 4 of Fig. 2, Figure 5 is a view taken as indicated by the line 5 of Fig. 4, Figure 6 is a vertical sectional view of a part of valve showing a modified form, Figure 7 is a view taken as indicated by the line 7 of Fig. 6, Figure 8 is a view similar to Fig. 6 showing another modification, Figure 9 is a view taken as indicated by the line 9 of Fig. 8, Figure 10 is a view similar to Fig. 8 showing another modification, and Figures 11 and 12 are views taken as indicated by the lines 11 and 12 respectively of Fig. 10.

As shown in said drawings, A indicates in general a steam boiler, B a blower engine and C a stoker engine. The blower engine B is adapted to blow air to the grates in any suitable manner, as, for example, by means of the blower 9 and conduit 10 leading from the blower to the space beneath the grates. The stoker engine C is adapted to feed fuel to the fire in any suitable manner, for example, by operating a mechanical grate.

The blower engine B is operated by steam conducted to it through the pipe 12 which is connected to any suitable source of steam supply, not shown. The stoker engine C is likewise operated by steam conducted to it through the pipe 13 which is also connected to any suitable source of supply, not shown. The engines C and B are controlled by valves D and D' respectively, interposed in the steam supply lines, as shown. The valves D and D' are controlled by variations in the steam pressure in the boiler A. This control of the valves by variations in the steam pressure may be accomplished in a variety of ways, and the particular way forms no part of the present invention. I have shown, somewhat in detail, one manner in which it may be accomplished; but it is obvious that, without detracting from the spirit of this invention, any other suitable means may be used. As shown, I have provided a steam pipe 15 leading from the boiler A into the top of the mercury reservoir 17. The bottom of the mercury reservoir 17 is connected by the pipe 19 to the bottom of the vertical mercury cylinder 21. Within the cylinder 21, floating on the mercury therein, is provided a free moving plunger or piston 23 on the top of which is mounted a cross-bar 25, the ends of which support the depending bars 27 which carry at their lower ends the yoke 29. Fastened to the yoke 29 is a flexible cable 31 leading downwardly around the pulley 32 thence upwardly over the fixed pulley 33, thence downwardly around the pulley 35 which is free to move upwardly and downwardly and thence upwardly to the arm 36, to the end of which it is attached. Supported by the pulley 32 is a weight 38, normally resting on the shelf 39. The pulley 35 is connected to a slide valve rod 40 adapted to operate the 4-way hydraulic valve 42. 45 indicates an hydraulic cylinder connected at its top and bottom to the 4-way valve 42 by the water lines 47 and 48 respectively. Within the cylinder 45 is arranged a piston adapted for upward and downward movement therein. Attached to the piston is the piston rod 50 to the upper end of which is fastened the arm 36, and also a flexible cable 52 leading over the pulleys 53 and 54 and thence downwardly and attached to the lever 60 on the valve E. Attached to the cable 52 at 61 is another cable 62 leading over the pulley 63 and thence downwardly to the lever 60' on the valve D'. Attached to the cable 52 at 64 is another cable 65 leading over the pulley 66 and atached to the breeching damper 67 arranged within the stack 68. The mechanism and parts are so arranged that steam pressure in the boiler A is conducted through the pipe 15 to the mercury reservoir 17 to force mercury therefrom through the pipe 19 into the cylinder 21 to raise the piston 23. Upward movement of the piston 23 operates to pull the cable 31 causing the pulley 35 to be raised and, through the rod 40, operate the 4-way valve 42. The 4-way valve 42 is supplied with water or other suitable fluid, under pressure from any suitable source through the pipe 70, and is so contructed that upward movement of the rod 40 will admit water from the supply pipe 70 through the pipe 47 to the upper end of the cylinder 45 and above the piston therein and at the same time permit water to escape through the pipe 48 from the lower end of the cylinder below the piston. Downward movement of the rod 40 has the opposite effect, admitting water under pressure below the piston in the cylinder 45 and allowing it to escape from above. The details of construction of the 4-way valve 42 are not shown or described as they form no part of the present invention in themselves. Such 4-way valves or other devices to accomplish the purposes shown are old in the art and may be made in a variety of ways. The piston rod 50 is suitably packed as indicated by 72. The mechanism and parts may be adjusted to operate as desired. For example, they may be so arranged that pressure beyond a desired point in the boiler A will cause the rod 40 to be pulled up. This action, as explained above, will cause the piston rod 50 to move downwardly, thus slackening the cable 31 and allowing the rod 40 again to descend until a balance is again reached. Lowering of the pressure will likewise cause upward movement of the rod 50. The rod 40 is provided with a weight 40' in order to assist in maintaining the mechanism in equilibrium, and to maintain the cable 31 taut. Upward and downward movement of the rod 50 through the cables 52 and 62 operates the levers 60 and 60' on the valves D and D'. The damper 67 is also operated by the cable 65. The parts may be connected and adjusted as desired. For example, they may be so arranged that an increase in steam pressure will cause downward movement of the rod 50 which will move the valves 60 and 60' toward their closed positions thus slackening the speed of the blower and stoker engines, and partially opening the damper 67. A decrease in steam pressure will have the opposite effect. It will be seen that with the parts constructed as shown the controls will always assume a balance or equilibrium and the position of the damper and speed of the blower engine and stoker engine will be varied from one extreme to the other through all the intermediate positions, always assuming and holding a certain position dependent upon the steam pressure at the time. The weight 38 on the pulley 32 is provided so that in case of any undue friction or sticking of parts it will be raised from the supporting shelf 39 and prevent breakage. It is of sufficient weight to normally rest on the shelf. I will consider the parts and mechanism as being so arranged and adjusted and will proceed to a description of the valves D and D'. Since these valves are in all respects similar I will describe but one in detail.

In Figs. 2 to 5 I have shown in detail one of the valves referred to. It will be seen that the valve comprises a vertical cylinder 100 with an inlet port 101 and an outlet port 102 diametrically opposite each other entering its side at the center. The ports 101 and 102 are rectangular in cross section. Arranged within the cylinder 100 and adapted for upward and downward movement is a piston 106 provided with a port 107 therethrough and also rectangular in cross section and adapted to register with the ports 101 and 102. The ports 101 and 102 are provided with threaded ends as indicated by 110 so that a supply steam pipe 12 or 13 may be connected to the inlet port 101 and so that a pipe connection may be made from the port 102 to the blower or stoker engine. The ends of the cylinder 100 are closed by heads 112 and 113 and the piston 106 is provided with two piston rods, 115 at the top and 116 at the bottom. The piston rods 115 and 116 operate through the heads 112 and 113 respectively and are suitably packed as indicated by 118 and 119, respectively. The upper end of the piston rod 115 is pivotally attached at 120 to the lever 60 and this lever is fulcrumed at 121 as shown. To the lower end of the cylinder are attached two depending arms 130 carrying at their lower ends a cylinder 131. The piston rod 116 extends downwardly through the cylinder 131 and is provided at its end with a short cross bar 135. Rotatably mounted within the cylinder 131 is a sleeve 137 provided with the circumferential groove 138 on its outer surface midway between its ends. The inner surface of the sleeve 137 is provided with a vertical slot or key-way 140 adapted to cooperate with a similar slot or key-way on the outer surface of the cylindrical block 150 which is shrunk or otherwise suitably mounted on the piston rod 116. A key 151 is provided to lie in the key-way 140 and the cooperating key-way on the block 150 in order to prevent rotation of the block 150 with respect to the sleeve 137. The key is loosely enough mounted, however, so that vertical movement of the block 150 in the sleeve 137 is permitted. Vertical movement of the sleeve 137 is prevented by means of the end of a set-screw 160 which extends radially through the cylinder 131 and enters the groove 138. Because of such groove, however, rotation of the sleeve 137 is permitted if the screw 160 is slightly loosened, but it may be set in any desired position by tightening the screw. The key is provided with overlapping hooks 170 at its ends adapted to engage with the sleeve 137 to prevent the key from dropping out. The piston rod 115 is provided with a joint 175 near its upper end of any suitable construction to permit rotation of the piston 106 without rotation of the upper end of the rod 115 where it is connected at 120 to the lever 60. The sleeve 137 is provided with an indicator 180 adapted to be read with respect to a scale 181 on the cylinder 131 in order to show the degree of rotation of the sleeve. The port 107 is so located in the piston 106 that when the piston is at the top of its stroke the port will be level with the ports 101 and 102. When the piston is at the bottom of its stroke all parts of the port 107 will be below all parts of the ports 101 and 102 so that the valve will be entirely closed, regardless of the degree of rotation of the piston 106. Intermediate positions will give intermediate openings. In the operation of the valve, the piston 106 may be rotated by means of the bar 135 and set in any desired positions by means of the set screw 160 as explained above. If the piston is so rotated that the port 107 will exactly register with the ports 101 and 102 when the piston is at the top of its stroke the valve will have its maximum opening at such point. If it is desired to decrease the maximum opening of the valve, the piston is rotated so that the port 107 will not exactly register with the ports 101 and 102 when the piston is at the top of its stroke. It will be seen that by means of this construction the maximum opening of the valve may be made as small as desired without changing the stroke of the valve.

In Fig. 8 I have shown in a fragmentary view, a part of a valve similar to the valves D and D' in which a different shaped port is provided. In this figure I have indicated the piston of the valve by 206 and the port by 207 corresponding to the piston 106 and the port 107 of the valve shown in Fig. 2. It will be noted that the port 207 is not rectangular in cross section, but has its top narrowed as indicated by 208. The ports through the cylinder wall are however rectangular in cross section as indicated by 201 and 202. With a port so constructed it is obvious that the rate of opening of the valve will not be in a direct proportion to the stroke of the valve, as is the case with the valve shown in Fig. 2. In other words, as the piston 206 is moved upwardly so that the port 207 commences to register with the ports 201 and 202 the valve will open slowly at first and then more rapidly in proportion to the rate of movement of the piston, such acceleration being caused by the widening of the port 207 at its bottom. In such a valve, rotation of the piston 206 will vary the maximum opening thereof as in the other form of valve. In Figs. 6 and 10 I have shown still other forms which the port might assume. For example, in Fig. 6 the port is indicated by 307 and is widened at the bottom as indicated by 308. In this form the port is wider at the top however than that shown in Fig. 8. In Fig. 10 I have shown a port indicated by 407 which is narrowed at the top at one end only and also narrowed from back to front as indicated by 408 (see Fig. 11). It is obvious that the port may assume various forms in order to establish any relation, as desired between the stroke and rate of opening. Regardless of the form of port, however, the piston of the valve is adapted for rotation in order to vary the maximum opening thereof.

In the foregoing specification where I have spoken of a constant range of fluctuation, such as constant range of fluctuation of steam pressure, I have meant to indicate that the fluctuations of the variable, such as the steam pressure, remain within fixed limits. For example, if the steam pressure of the boiler never exceeds 100 pounds and never falls below 50 pounds, in normal operation, but always fluctuates between these two limits of 50 pounds and 100 pounds, I would say that the range of fluctuation of the steam pressure is from 50 to 100 and that this range, being always between 50 and 100, is constant.

My invention has been described as adapted for use, for example, in connection with a steam boiler where the rate of flow of steam, water or other fluid is controlled by mechanism automatically fluctuating with respect to a variable such as the steam pressure. In such a device the fluctuation of the steam pressure of the boiler is confined within certain limits. That is, the steam pressure which is the variable fluctuates through a constant range. The fluctuations of the variable are kept within a constant range by any suitable means such as, for example, a safety valve which prevents the steam pressure from ever exceeding a certain maximum. With a safety valve set at a certain maximum, the steam pressure will fluctuate within a constant range extending from atmospheric pressure to the pressure at which the safety valve is set to blow off.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

What I claim as new and desire to secure by Letters Patent is:

1. In an automatic control device, a valve with a constant stroke controlled by fluctuations in a variable through a directly proportional range, and means for varying the maximum opening through the valve.

2. In an automatic control device, a valve controlled by fluctuations in a variable through a constant range, said valve having a constant stroke and directly proportional relation between its stroke and opening, and means for varying the maximum opening through the valve.

3. In an automatic control device, a valve with a constant stroke controlled by fluctuations in a variable through a constant range, said valve comprising a cylinder with diametrically arranged ports in its side, a piston adapted for vertical movement in the cylinder and having a port adapted to register with the ports in the cylinder, and means for rotating the piston, so as to vary the maximum opening through the valve.

In witness whereof I have hereunto set my hand and seal.

GERALD S. CARRICK. [L. S.]